UNITED STATES PATENT OFFICE 2,537,655

AUTO-OXIDATION OF ALKYLATED ANTHRAQUINONES

Lynn H. Dawsey, Carl K. Muehlhausser, and Robert R. Umhoefer, Kenmore, N. Y., assignors to Buffalo Electro-Chemical Company, Inc., Tonawanda, N. Y.

No Drawing. Application March 9, 1950, Serial No. 148,732

7 Claims. (Cl. 23—207)

The present invention relates to the production of hydrogen peroxide by cyclic hydrogenation and oxidation of alkylated anthraquinones in an improved solvent medium.

It has been proposed to produce hydrogen peroxide from hydrogen and oxygen gases through alternate oxidation and reduction of alkylated anthraquinones dissolved in organic solution. The production of the hydrogen peroxide by this process proceeded in two main stages: (1) the hydrogenation stage where the alkylated quinone was reduced to the alkylated hydroquinone and (2) the oxidation stage where the alkylated hydroquinone was oxidized to the quinone, hydrogen peroxide splitting off during this operation. After separation of the hydrogen peroxide and the purification of the solution, the cycle of the two stages was repeated. This type of procedure has been described in U. S. Patent 2,215,833 and its commercial application in PB Report 395. Suggestions for operating in a single, non-volatile solvent have been recently made in Dawsey et al. 2,455,238.

In this prior method of manufacture, a mixed solvent was suggested as the reaction medium consisting of a constituent capable of dissolving the quinone material and a constituent capable of dissolving the hydroquinone material. The practical result achieved was that the solution could be ultimately oxidized and reduced in cyclic fashion in the liquid phase without separation of either form of the working material. The quinone solvent normally employed has been an ether, a hydrocarbon (usually benzene) or similar flammable solvent. Such hydrocarbons, however, have practically zero dissolving power for the hydroquinone form of the working compound and the hydroquinone solvent component has consisted of the higher aliphatic alcohols. However, the solubility of the hydroquinones in the higher alcohols is not very great and this limits the amount of hydroquinone that can be treated or worked per cycle which, in turn, limits the amount of hydrogen peroxide that can be produced per cycle. General experience in commercial operation of the prior process, as outlined in the literature cited above, indicates that 10% of dissolved compound may be successfully worked with the realization of hydrogen peroxide concentrations of about 5.5 grams per liter in the organic solution, after the oxidation phase of the cycle.

Furthermore, due to the fact that the hydrogen peroxide was recovered by aqueous extraction of the mixed solvent, a continuous and relatively high mechanical loss of the hydroquinone solvent in the mixture was experienced due to the slight solubility of the higher alcohols in water.

It is an object of the present invention to provide an improved medium for use in the production of hydrogen peroxide by auto-oxidation of alkylated anthrahydroquinones.

It is also an object of the invention to provide an improved solvent medium for such auto-oxidation process having a greater solvent power for the hydroquinone constituent and as an ancillary object to improve the amount of hydrogen peroxide produced per operating cycle.

It is also an object of the invention to provide an improved solvent medium for use in the production of hydrogen peroxide by auto-oxidation process wherein the mechanical loss of the solvent is reduced during the aqueous extraction phase of the process.

It is a further object of the invention to provide, as a constituent of the mixed solvent used in auto-oxidation of alkylated anthraquinones, a material that is not only non-inflammable but which is actually flame retardant.

It is an object of the present invention to provide a solvent constituent that is non-volatile, permanent and unaffected during either the oxidation or reduction cycle.

It is an object of the present invention to provide, as a constituent of a mixed solvent, the esters of phosphoric acid as improved solvents for the hydroquinone material in auto-oxidation of alkylated anthraquinones.

In accordance with the broad aspects of the present invention, when an organic ester of phosphoric acid is used as a constituent for solutions of the hydroquinone compound with the usual quinone solvent constituent in auto-oxidation processes employing alkylated anthraquinones, greater yields per cycle of hydrogen peroxide may be obtained by reason of the greater initial concentration of the quinone permitted with consequent production of higher concentration of hydroquinone in the reaction solvent.

According to our invention, we employ organic phosphate esters having the general formula:

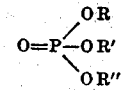

where R, R' and R'' may be identical alkyl or identical aryl groups. A mixed ester containing both alkyl and aryl radicals may also be used. We have found that phosphate esters with three alkyl groups, generally exhibit a high solubility for the hydroquinones together with low solubility for the corresponding quinones. Progressive substitution of aryl for alkyl groups in the R, R' and R" positions, however, raises the relative quinone solubility with some lowering of the capacity of the solvent for dissolving hydroquinone compound.

We have found some of the useful phosphate esters to dissolve the following quantities, in grams per liter of solvent, of the quinone and the hydroquinone forms of 2-ethylanthraquinone at 25° C.

| Solvent | Quinone | Hydroquinone |
|---|---|---|
| Tributyl phosphate | 57 | 336 |
| Trioctyl phosphate | 40 | 202 |
| Diphenyl octyl phosphate | 72 | 165 |
| Diphenyl cresyl phosphate | 106 | 137 |
| Tricresyl phosphate | 123 | 154 |

Although the solvents disclosed herein are especially suitable for use in preparation of work solutions wherein 2-ethylanthraquinone is employed as the working compound in the manufacture of hydrogen peroxide, we have also found them to be excellent solvents for the other known organic working compounds, namely, the alkylated anthraquinones. The phosphate ester solvents are applicable in the making up of work solutions in which compounds like tetrahydro-2-ethylanthraquinone, 2 - methylanthraquinone, and the like, are substituted in place of 2-ethylanthraquinone as the working compound. The 2-ethylanthraquinone is the chief commercially operable intermediate due to its relatively greater chemical stability, generally higher solubility and its faster rates of oxidation and reduction in solution.

According to this invention, any tri-substituted organic ester of phosphoric acid, or mixture of esters thereof, may be used which is a liquid at the temperature employed and which is substantially insoluble in water at ordinary temperatures. Such an ester may be an alkyl, aryl, or mixed alkyl-aryl phosphate. Examples of suitable solvents of alkyl substituency which are both non-volatile and substantially insoluble in water are tributyl-, triamyl-, trihexyl-, trioctyl-, and higher molecular weight phosphates. The aliphatic phosphate esters of lower order than tributyl phosphate, such as triethyl- and trimethyl-phosphates, are not especially recommended since these are appreciably soluble in water.

Examples of aryl esters are triphenyl-, tricresyl-, diphenylcresyl-, and tribenzyl-phosphates. An example of a mixed aryl-alkyl ester is diphenyl-butyl-phosphate, or dicresyl-octyl-phosphate.

Obviously, we may employ a mixture of esters such as triphenyl-phosphate, which is a solid, and tricresyl-phosphate, which is a liquid to form the hydroquinone solvent component of the work solution.

In general, therefore, the ester group of the tri-substituted phosphates, may be an alkyl or aryl group from 1 carbon atom to 12 carbon atoms, and may be a single group, or may be a mixed alkyl-aryl ester or a mixture of a number of tri-substituted esters.

The following examples illustrate the production of hydrogen peroxide from work solutions containing certain of the phosphate esters of this invention. In considering these illustrations, it must be remembered that the hydrocarbon, or quinone solvent component of the work solution, has a practically zero dissolving power for the hydroquinone and any hydroquinone which may be worked is due solely to the dissolving power of the phosphate esters. Further, the examples are merely illustrative of the principles of the invention and are not to be deemed limitative thereof, as other alkylated anthraquinones may be employed in lieu of 2-ethylanthraquinone specifically illustrated as the working compound.

*Example I.—Tributyl-phosphate*

A solvent mixture was made up consisting of 667 cc. of tributyl-phosphate and 1333 cc. of benzene to give a 2000 cc. volume having a specific gravity of 0.908. In this mixture, 420 g. of 2-ethylanthraquinone was dissolved to give a work solution of 2341 cc. volume with a specific gravity of 0.955 and a quinone concentration of 179 g. per liter. The solution was purified by washing with aqueous 10% sodium hydroxide, drying with anhydrous potassium carbonate, and then passing it through a bed of activated alumina.

The purified solution was hydrogenated under agitation in the presence of 6 g. of porous nickel catalyst. During a period of 40 minutes, 22.9 liters of hydrogen gas was absorbed, measured at 27° C. and 727 mm. Hg pressure. The temperature of the solution rose from 26° C. to 35° C. The agitator was stopped, the reduced solution and catalyst were drained out of the hydrogenating vessel, through a layer of diatomaceous earth held on a sintered glass filter, then into an oxidation vessel. The filter removed the catalyst from the solution before its introduction into the oxidation vessel. The latter vessel had previously been flushed out with inert nitrogen. The nitrogen was replaced with air before beginning oxidation. Oxidation was allowed to proceed in a gaseous atmosphere of essentially air composition, which was necessary since pure oxygen and benzene vapors form an explosive gas mixture. After 130 minutes, the measured oxygen uptake from the air employed was 22.6 liters. The solution returned to the original yellow color as before the hydrogenation, indicating complete oxidation. The hydrogen peroxide dissolved in the solvent was extracted by washing first with six 50 cc. portions of water, then six times further with 100 cc. portions. The hydrogen peroxide obtained amounted to 29.4 grams, or a 97.4% yield.

According to this example, the concentration of hydrogen peroxide produced before extraction, amounted to 12.5 grams per liter of work solution; that is, over twice the concentration (5.5 grams per liter) possible according to the earlier practice referred to herein, where alcohols were employed in solution make-up. This marked increase in the hydrogen peroxide production capacity is due solely to a simple substitution of tributyl-phosphate, in place of the heretofore used alcohols, in solution make-up.

The next example illustrates the practice of the invention wherein a somewhat higher molecular weight phosphate of aliphatic nature is employed in solution make-up.

*Example II.—Trioctyl-phosphate*

A solvent mixture was made up consisting of 900 cc. of trioctyl-phosphate and 1350 cc. of benzene, to give a 2250 cc. volume having a specific gravity of 0.894. In this mixture, 360 g. of 2-ethylanthraquinone was dissolved to give a work solution of 2542 cc. volume, with a specific gravity of 0.932, and a quinone concentration of 141 g. per liter. Purification was carried out as in Example I. The solution was treated in the same apparatus, along the same procedure lines as in the previous example, which included the steps of hydrogenation, filtration, oxidation and extraction. It was first hydrogenated at 26°–35° C. after addition of 6 g. of catalyst, for a period of 105 minutes, until 19.7 liters of hydrogen, measured at 726 mm. and 27° C., had been absorbed. The oxidation time was 130 minutes, after which 18.6 liters of oxygen was absorbed from the air employed. The hydrogen peroxide obtained after 9 extractions with water, amounted to 23.9 g., which corresponded to a 92.3% recovery, based upon the hydrogen consumed, and a 97.5% yield, based upon the oxygen consumed. The hydrogen peroxide concentration in the solvent solution, before extraction, was 9.4 g. per liter, representing a 71% gain in working capacity for this solution over a similar work solution compounded with the heretofore used alcoholic hydroquinone solvents.

The next example illustrates the invention as practiced with an aryl phosphate ester as a constituent of the working solvent:

*Example III.—Diphenylcresyl-phosphate*

The mixture was made from 1333 cc. of diphenylcresyl-phosphate, and 667 cc. of commercial redistilled dimethylnaphthalene to give a solvent volume of 2000 cc. of specific gravity 1.134. In this mixture, 320 g. of 2-ethylanthraquinone was dissolved to give a work solution of 2260 cc. volume and 1.144 specific gravity. After purification, the solution was processed in the same fashion as described in Example I. Hydrogenation was effected with 6 g. of porous nickel, at 25°–35° C. during a period of 187 minutes, with the consumption of 17.5 liters of gas, measured at 722 mm. Hg and 25° C. The oxidation step was carried out rapidly at atmospheric pressure, under oxygen in place of air, since the solution was non-volatile and offered no explosion hazard. The oxygen consumed amounted to 17.1 liters. The hydrogen peroxide extracted in four successive water washes with 22.4 g., giving a yield of 97%, based upon the hydrogen consumed. The concentration of peroxide in the work solution before extraction was, therefore, 9.9 g. per liter, representing an 80% gain in working capacity for this solution over a similar work solution compoundned with the hitherto used alcoholic hydroquinone solvents.

What is claimed is:

1. In the process for making hydrogen peroxide by reduction and auto-oxidation of alkylated anthraquinones dissolved in a mixed solvent including a solvent constituent for the quinone form and a solvent for the hydroquinone form of the alkylated anthraquinone, the improvement which comprises employing as a constituent of the mixed solvent a tri-substituted organic ester of phosphoric acid.

2. In the process for making hydrogen peroxide by reduction and auto-oxidation of alkylated anthraquinones dissolved in a mixed solvent including a solvent constituent for the quinone form and a solvent for the hydroquinone form of the alkylated anthraquinone, the improvement which comprises employing as a constituent of the mixed solvent a tri-substituted alkyl ester of phosphoric acid.

3. Method according to claim 2 wherein the ester is dibutyl phosphate.

4. Method according to claim 2 wherein the ester is trioctyl phosphate.

5. In the process for making hydrogen peroxide by reduction and auto-oxidation of alkylated anthraquinones dissolved in a mixed solvent including a solvent constituent for the quinone form and a solvent for the hydroquinone form of the alkylated anthraquinone, the improvement which comprises employing as a constituent of the mixed solvent a tri-substituted aryl ester of phosphoric acid.

6. Method according to claim 5 wherein the ester is diphenylcresyl phosphate.

7. In the process for making hydrogen peroxide by reduction and auto-oxidation of alkylated anthraquinones dissolved in a mixed solvent including a solvent constituent for the quinone form and a solvent for the hydroquinone form of the alkylated anthraquinone, the improvement which comprises employing as a constituent of the mixed solvent a tri-substituted mixed alkyl-aryl ester of phosphoric acid.

LYNN H. DAWSEY.
CARL K. MUEHLHAUSSER.
ROBERT R. UMHOEFER.

No references cited.